(12) United States Patent
Lortz et al.

(10) Patent No.: US 7,918,933 B2
(45) Date of Patent: Apr. 5, 2011

(54) DISPERSION OF HIGH SURFACE AREA SILICA

(75) Inventors: Wolfgang Lortz, Waechtersbach (DE); Gabriele Perlet, Großkrotzenburg (DE); Werner Will, Gelnhausen (DE); Kai Schumacher, Hofheim (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/519,000

(22) PCT Filed: Aug. 28, 2007

(86) PCT No.: PCT/EP2007/058935
§ 371 (c)(1),
(2), (4) Date: Nov. 4, 2009

(87) PCT Pub. No.: WO2008/071462
PCT Pub. Date: Jun. 19, 2008

(65) Prior Publication Data
US 2010/0107930 A1      May 6, 2010

(30) Foreign Application Priority Data

Dec. 15, 2006 (DE) .......................... 10 2006 059 316

(51) Int. Cl.
*C01B 33/14* (2006.01)
*C01B 33/18* (2006.01)
*C01B 33/113* (2006.01)
*C01B 33/141* (2006.01)

(52) U.S. Cl. .................. 106/482; 106/286.7; 106/287.1; 106/287.34; 423/322

(58) Field of Classification Search .................. 106/482, 106/286.7, 287.1, 287.34; 423/332
See application file for complete search history.

(56) References Cited

U.S. PATENT DOCUMENTS

| 6,676,719 | B2 * | 1/2004 | Lortz et al. ...................... 51/308 |
| 2002/0134027 | A1 | 9/2002 | Lortz et al. | |
| 2006/0104881 | A1 | 5/2006 | Lortz et al. | |

FOREIGN PATENT DOCUMENTS

| EP | 1 216 958 | 7/2005 |
| JP | 2005 154222 | 6/2005 |
| WO | 2004 089816 | 10/2005 |

* cited by examiner

*Primary Examiner* — Anthony J Green
(74) *Attorney, Agent, or Firm* — Oblon, Spivak, McClelland, Maier & Neustadt, L.L.P.

(57) ABSTRACT

Dispersion comprising water and mixed potassium silicon oxide powder, where—the mixed oxide powder is in the form of aggregates of primary particles, has a BET surface area of 100 to 400 m$^2$/g, has an average aggregate diameter in the dispersion of less than 100 nm, and possesses a potassium fraction of 0.05% to 1.5% by weight, calculated as $K_2O$ and based on the mixed oxide powder, and—the dispersion has a fraction of mixed oxide powder in the dispersion of 25% to 40% by weight, the sum of water and mixed oxide powder is at least 98% by weight and the pH is 9 to 11.5.

11 Claims, 3 Drawing Sheets

DISPERSION OF HIGH SURFACE AREA SILICA

The invention relates to a highly filled dispersion comprising high surface area silica and to its preparation and use.

Highly filled silica dispersions are known. They are used, for example, in polishing processes (chemical mechanical polishing), in the paper industry for producing a paper coating, or in the glass industry for producing glass mouldings.

Fumed silica powders are prepared preferably by flame hydrolysis. In this operation a vapour-form silicon compound, generally silicon tetrachloride, is burnt with hydrogen and oxygen. In the course of this operation, in a first step, reaction of hydrogen with oxygen generates water, which in a second step hydrolyses the silicon compound to form fumed silica.

In this operation, primary particles are formed first of all, and in the further course of reaction may join to form aggregates. Aggregates are fused primary particles. The aggregates may congregate further to form agglomerates. When fumed silica is dispersed, first of all the agglomerates are separated under the action of low dispersing energy. At higher dispersing energies, there is also conversion of relatively large aggregates into smaller aggregates.

U.S. Pat. No. 5,246,624 and EP-A-773270 disclose processes for preparing dispersions of fumed silica powder.

The principle underlying the invention disclosed in U.S. Pat. No. 5,246,624 is the achievement of, as far as possible, complete destructuring of the fumed silica powder in the acidic pH range under the action of high shearing energies into a system which within this pH range has a high viscosity. Although it is also disclosed that the process can be employed for all fumed silicas, it has nevertheless emerged that only silica powders having a BET surface area of less than 75 $m^2/g$ produce stable dispersions. Stable dispersions of silica powders with higher BET surface areas are not obtainable in accordance with U.S. Pat. No. 5,264,624. Moreover, immediately after preparation, dispersions display a pronounced structural viscosity, in other words high viscosities at low shear rates.

This is also found in EP-A-773270. The problem of obtaining highly filled, stable dispersions of silica of relatively high BET surface area is solved there by means of high-pressure grinding. In this procedure, two highly pressurized streams of a preliminary dispersion undergo collision, as a result of which the particles undergo self-grinding (high-energy mill). By this means it is possible to obtain dispersions of silica having a BET surface area of 90 to >500 $m^2/g$ and a silica content of up to 40% by weight.

EP-A-1216958 discloses an aqueous dispersion which comprises a fumed silica powder which is doped with alkali metal and has an average particle size of less than 100 nm. Owing to the very low level to which the primary particles have joined together, this powder is readily dispersible. Disclosed specifically is a process in which, by collision of two highly pressurized particle streams, the particles undergo mutual grinding. This process can be used to prepare highly filled dispersions of silica. In EP-A-1216958, for example, a 30 per cent by weight dispersion of potassium-doped silicas with a BET surface area of approximately 100 to 130 $m^2/g$ is disclosed.

The preparation of stable, highly filled dispersions of high surface area, aggregated silicas by dispersing techniques more cost-effective than the collision of two preliminary-dispersion streams has not been accomplished.

It was an object of the present invention, therefore, to provide a more cost-effective process for preparing a stable, low-viscosity dispersion of high surface area silica with a low structural viscosity.

A further object of the present invention was to provide a stable, low-viscosity dispersion of high surface area silica with a low structural viscosity.

The invention provides a dispersion comprising water and mixed potassium silicon oxide powder, which is characterized in that the mixed oxide powder
is in the form of aggregates of primary particles, has a BET surface area of 100 to 400 $m^2/g$, has an average aggregate diameter in the dispersion of less than 100 nm, and
possesses a potassium fraction of 0.05% to 1.5% by weight, calculated as $K_2O$ and based on the mixed oxide powder, and
the dispersion
has a fraction of mixed oxide powder in the dispersion of 25% to 40% by weight,
the sum of water and mixed oxide powder is at least 98% by weight and
the pH is 9 to 11.5.

The mixed potassium silicon oxide powder can with preference be one obtained by a pyrogenic operation. The powders in question may with particular preference be those disclosed in the patent applications bearing the patent application numbers DE102005027720.9 (filing date: 16 Jun. 2005) and EP05024753.5 (filing date: 12 Nov. 2005). These powders, in contrast to that known from DE-A-10065028, are powders with a high structure, something which becomes clear, for example, as a result of the presence of an endpoint in the dibutyl phthalate determination. The structure is closer to that of fumed silicas of comparable BET surface area.

The powder disclosed in the German patent application bearing the application number 102005027720.9 is a mixed potassium silicon oxide powder in the form of aggregates of pore-free primary particles which contains 0.2% to 1.5% by weight of $K_2O$, distributed in the core and on the surface of the primary particles, and which possesses a BET surface area of 100 to 350 $m^2/g$ and a specific DBP number, expressed as the DBP number per square metre of specific surface area, which is greater than or equal to that of a fumed silica powder of equal BET surface area that does not contain the potassium component.

The powder disclosed in the European patent application bearing the application number EP05024753.5 is a mixed potassium silicon oxide powder in which the potassium component is located exclusively on the surface of the primary particles.

The DBP number per square metre of specific surface area of the aforementioned powders is preferably more than 1.14.

The fraction of the potassium component, calculated as $K_2O$, of the powder present in the dispersion of the invention is 0.05% to 2% by weight. Below a value of 0.05% by weight, stable, highly filled dispersions can be prepared only using high-energy mills. Above a value of 2.0% by weight, no further additional effect is observable. The fraction of the potassium component is preferably 0.1% to 0.4% by weight. It is important for the invention that even such small amounts are sufficient, in contrast to pure silica dispersions, to obtain stable dispersions.

The BET surface area of the mixed potassium silicon oxide powder can be varied from 100 to 400 $m^2/g$. A BET surface area which has proven to be particularly advantageous in the context of subsequent use as a coatings constituent is from 150 to 350 m²/g and in particular from 175 to 225 and 270 to 330 m²/g with particular advantage.

The invention further provides a process for preparing the dispersion of the invention, wherein water from a reservoir is circulated via a rotor/stator machine and, via a feed means, continuously or discontinuously and with the rotor/stator machine running, mixed oxide powder is introduced in an amount such as to result in a preliminary dispersion having a mixed oxide powder content of between 30% and 50% by weight, and, after all of the mixed oxide powder has been added, the feed means is closed and shearing is carried out at a pH of 2 to 4 and at a temperature of 10 to 50° C. with a shear rate of 10 000 to 30 000 s$^{-1}$, dilution is carried out with sufficient water that the desired solids content is exceeded by 0.1% to 10%, based on the desired solids content, and subsequently, under the same shearing conditions, an aqueous base is added, in an amount and concentration such that the amount needed to attain the desired solids content is attained and a pH of 9 to 11.5 results.

If desired, further dilution can be carried out with water in order to set a desired content and a desired pH.

The process of the invention is distinguished by the fact that, prior to the addition of the aqueous base, the solids content has been almost reached by dilution with water. The solids content prior to the addition of the aqueous base is 0.1% to 10%, preferably 0.2% to 5% and more preferably 0.4% to 2.5% above the desired solids content.

The percentages are based on the desired solids content. For example, in the case of a desired solids content of 30% by weight, dilution should be carried out with sufficient water that the solids content is 30%+0.1%=30.03% by weight to 30%+10%=33% by weight, preferably 30%+0.2%=30.06% by weight to 30%+5%=31.5% by weight, and more preferably 30%+0.4%=30.12% by weight to 30%+2.5%=30.75% by weight.

If the solution containing the mixed oxide does not already have a pH of 2 to 4, such a pH can be set by addition of an acid. In general the mixed potassium silicon oxide powders employed already have a pH in the range from 2 to 4. In these cases there is no need to add acid. The nature of the acid itself is not critical. Typically, hydrochloric, sulphuric or nitric acid is used.

A factor which may be critical, in contrast, is the temperature of dispersion during the dispersing operation in the acidic range. It has been observed that, at temperatures of more than 55° C., spontaneous gelling may occur. Cooling of the dispersion during the dispersing operation may therefore be advantageous.

After the end of the dispersing operation in the acidic range, first water and then base are added, in order to give a pH of 9 to 11.5. The amount of base required is added in this case advantageously not in portions; instead, the entire amount of base is added all at once and rapidly.

The nature of the base is not critical. Bases which have proven to be particularly suitable include aqueous potassium hydroxide, sodium hydroxide, ammonia, aqueous ammonia, amines such as monoethanolamine, diethanolamine, triethanolamine, monoisopropanolamine, diisopropanolamine, triisopropanolamine, N,N-dimethyl-isopropanolamine, tetraalkylammonium hydroxides, morpholine, and amino alcohols, such as 3-amino-1-propanol, 1-amino-2-propanol and 2-amino-2-methyl-1-propanol.

The concentration of the base is not critical. It has, however, proven to be advantageous to use bases with a concentration of 2 to 20 mol/l, more preferably 5 to 18 mol/l and very preferably 8 to 15 mol/l.

The invention further provides for the use of the dispersion of the invention for producing transparent sealants and filling compounds, especially transparent compositions containing acrylate.

The use of silica powder as a reinforcing agent when producing transparent compositions is known. The use of the highly voluminous powders, however, entails the incorporation of a large quantity of air as well into the aqueous, viscous acrylate dispersion. In order then to arrive at transparent formulations it is then necessary, in a time-consuming air removal step, to remove the gas bubbles. If, then, the dispersion of the invention is introduced instead of the silica powder, the air removal has already taken place during the preparation of the dispersion, since in the course of preparation of the dispersion there has been an operating step at very low viscosity.

The resin (A) may also comprise unsaturated acrylic resin having a number-average molecular weight of 2000 to 50 000. Specific examples thereof are a resin prepared by addition reaction of glycidyl (meth)acrylate, allyl glycidyl ether with a carboxyl-containing acrylic resin which has been prepared by copolymerizing an ethylenically unsaturated acid, such as (meth)acrylic acid, as a parent building block with at least one monomer selected from (meth)acrylates, such as methyl (meth)acrylate and butyl (meth)acrylate, styrene and (meth)acrylonitrile; a resin which is prepared by addition reaction of the product of reaction between 2-hydroxyethyl (meth)acrylate or (meth)allyl alcohol and a diisocyanate compound to form a hydroxyl-containing acrylic resin, which is prepared by copolymerizing a hydroxyl-containing monomer as a fundamental component with the above monomer.

The invention further provides for the use of the dispersion of the invention in the production of coatings, particularly of acrylate coating materials.

These materials comprise as their acrylate constituent at least one (meth)acrylate monomer and/or oligomer. Suitable monomers may be hydroxyethyl methacrylate, trimethylolpropane formyl acrylate, hexanediol diacrylate, tripropylene glycol diacrylate, neopentyl glycol diacrylate, trimethylolpropane triacrylate, glycerol triacrylate, pentaerythritol tetraacrylate and/or derivatives of these compounds. The coatings are notable for high scratch resistance and high transparency after curing. They can be utilized, for example, for optical lenses.

EXAMPLES

Preparation of Starting Materials

Example P1

Mixed potassium silicon oxide powder P1 (in accordance with the German patent application bearing the application number 102005027720.9 of 16 Jun. 2005): 85 kg/h SiCl$_4$ are vaporized and transferred into the central tube of the burner, of the kind described in DE-A-19650500. Fed into this tube in addition are 40 m³/h (stp) hydrogen and 124 m³/h (stp) air. This gas mixture flows out of the inner burner nozzle and burns in the burner chamber of a water-cooled flame tube. In order to avoid instances of caking, an additional 4 m³/h (stp) of secondary hydrogen are fed into the jacket nozzle surrounding the central nozzle.

The aerosol is obtained from a five per cent strength aqueous potassium chloride solution by means of a two-fluid nozzle mounted on the base of the vessel. 1100 g/h aerosol are generated. The aerosol is carried through an externally heated line by means of a stream of carrier gas (air) of 18 m³/h (stp) which is directed such that it impinges first laterally to the two-fluid nozzle on the base of a plate to which the two-fluid nozzle is mounted, and in the course of being carried through said line it is heated to 120° C. The aerosol/carrier gas mixture then leaves the inner nozzle and is mixed homogeneously with the gas mixture of silicon tetrachloride, hydrogen and oxygen. After the flame hydrolysis, the reaction gases and the resulting powder are drawn under suction through a cooling system, by the application of an underpressure, and in the course of this procedure the particle/gas stream is cooled to approximately 100 to 160° C. The solid is separated from the outgoing gas stream in a filter or cyclone. In a further step, at temperatures between 400 and 700° C., residues of hydrochloric acid that are still adhering are removed from the silica powder by treatment with air containing water vapour. The resulting powder is obtained as a white, finely divided powder.

The potassium content of the powder P1, calculated as $K_2O$, is 0.12% by weight, the BET surface area 216 m²/g, DBP number/BET 1.5 g/m², $d_n/d_a$ 0.69. The pH of a four per cent dispersion in water is 4.1.

Example P2

Mixed potassium silicon oxide powder P2 (in accordance with the European patent application bearing the application number 05024753.5 of 12 Nov. 2005): 4.44 kg/h of silicon tetrachloride are vaporized. The vapour is transferred into a mixing chamber by means of 3.3 m³/h (stp) air as carrier gas. Separately from this, 2.3 m³/h (stp) of core hydrogen and 6.9 m³/h (stp) of primary air are introduced into the mixing chamber. In a central tube, the reaction mixture is supplied to a burner and ignited. The flame burns in a water-cooled flame tube. An additional 20 m³/h (stp) of secondary air is introduced into the reaction chamber. At a temperature of 320° C., 191 g/h of a 3.0% by weight solution of potassium chloride in water is introduced through nozzles into this stream of silica particles, hydrochloric acid, air and nitrogen. After an average residence time of 12 ms, the temperature of the mixture is increased to 500° C. After an average residence time of 24 s, the metal oxide particles are deposited in a downstream filter.

The potassium content of the powder P2, calculated as $K_2O$, is 0.14% by weight, the BET surface area 299 m²/g.

Preparation of Inventive Dispersions

Example D1

A 100 l stainless steel batching vessel is charged with 45.0 kg of DI (fully demineralized) water. Subsequently, using the suction hose of the Ystral Conti-TDS 3 (stator slot: 4 mm ring and 1 mm ring, rotor/stator distance: approximately 1 mm) 30 kg of P1 are inducted under shearing conditions. After the end of the addition, the induction port is closed and subsequent shearing takes place at 3000 rpm for 20 minutes. The heat generated in the course of the dispersing operation is taken off by means of an external heat exchanger. Using 20 kg of DI water, the dispersion is diluted and the pH is adjusted from 3.4 to 10.0 using 2.6 kg of aqueous potassium hydroxide solution (30% strength), with shearing. Subsequently 2.4 kg of DI water are added, to give an $SiO_2$ content of 30% by weight, and shearing is repeated for approximately 5 minutes for homogenization.

The average aggregate diameter is 81 nm (determined using Horiba LA 910) or 47 nm (determined using Zetasizer 2000 HS, Malvern).

Even after 6 months, the dispersion shows no signs of gelling or sedimentation.

Example D2

As in Example D1, but using the powder P2 and a final concentration of 25% by weight of powder P2.

The average aggregate diameter is 75 nm (determined using Horiba LA 910) or 39 nm (determined using Zetasizer 2000 HS, Malvern).

Even after 6 months, the dispersion shows no signs of gelling or sedimentation.

Preparation of a Dispersion According to the Prior Art

Example D3

A 100 l stainless steel batching vessel is charged with 45.0 kg of DI (fully demineralized) water. Subsequently, using the suction hose of the Ystral Conti-TDS 3 (stator slot: 4 mm ring and 1 mm ring, rotor/stator distance: approximately 1 mm), 30 kg of AEROSIL® 200, a fumed $SiO_2$ having a BET surface area of 200 m²/g are inducted over the course of 50 minutes under shearing conditions. After the end of the addition of AEROSIL® 200, the induction port is closed and subsequent shearing takes place at 3000 rpm for 60 minutes. The heat generated in the course of the dispersing operation is taken off by means of an external heat exchanger. Using 20 kg of DI water, the dispersion is diluted and the pH is adjusted from 3.2 to 10.0 using 2.2 kg of aqueous potassium hydroxide solution (30% strength), with shearing. Subsequently 2.8 kg of DI water are added, to give an $SiO_2$ content of 30% by weight, and shearing is repeated for approximately 5 minutes for homogenization.

The average aggregate diameter is 119 nm with a fraction of about 1.5% of coarser, gelled particles at about 25 μm (determined using Horiba LA 910).

Figure 1:
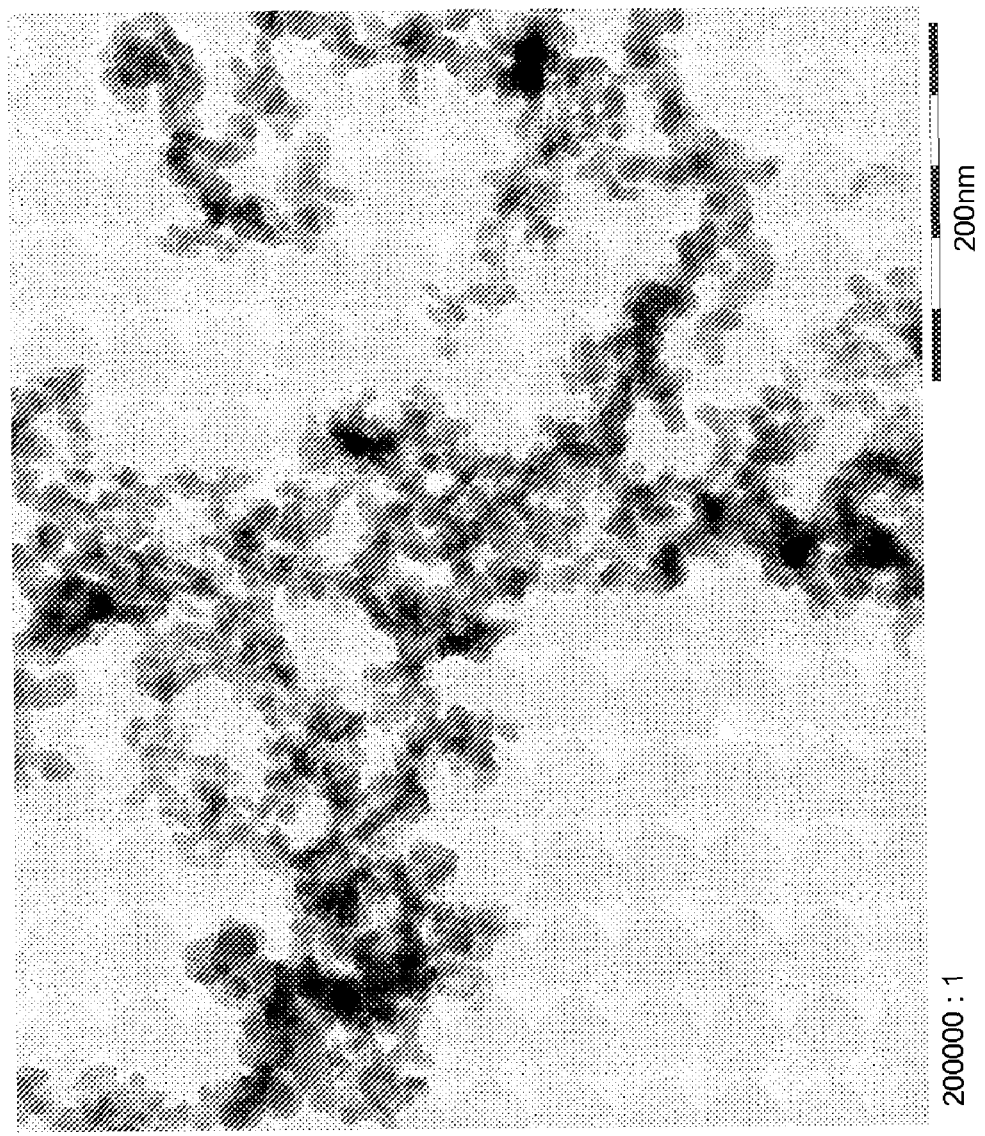
Figure 2:
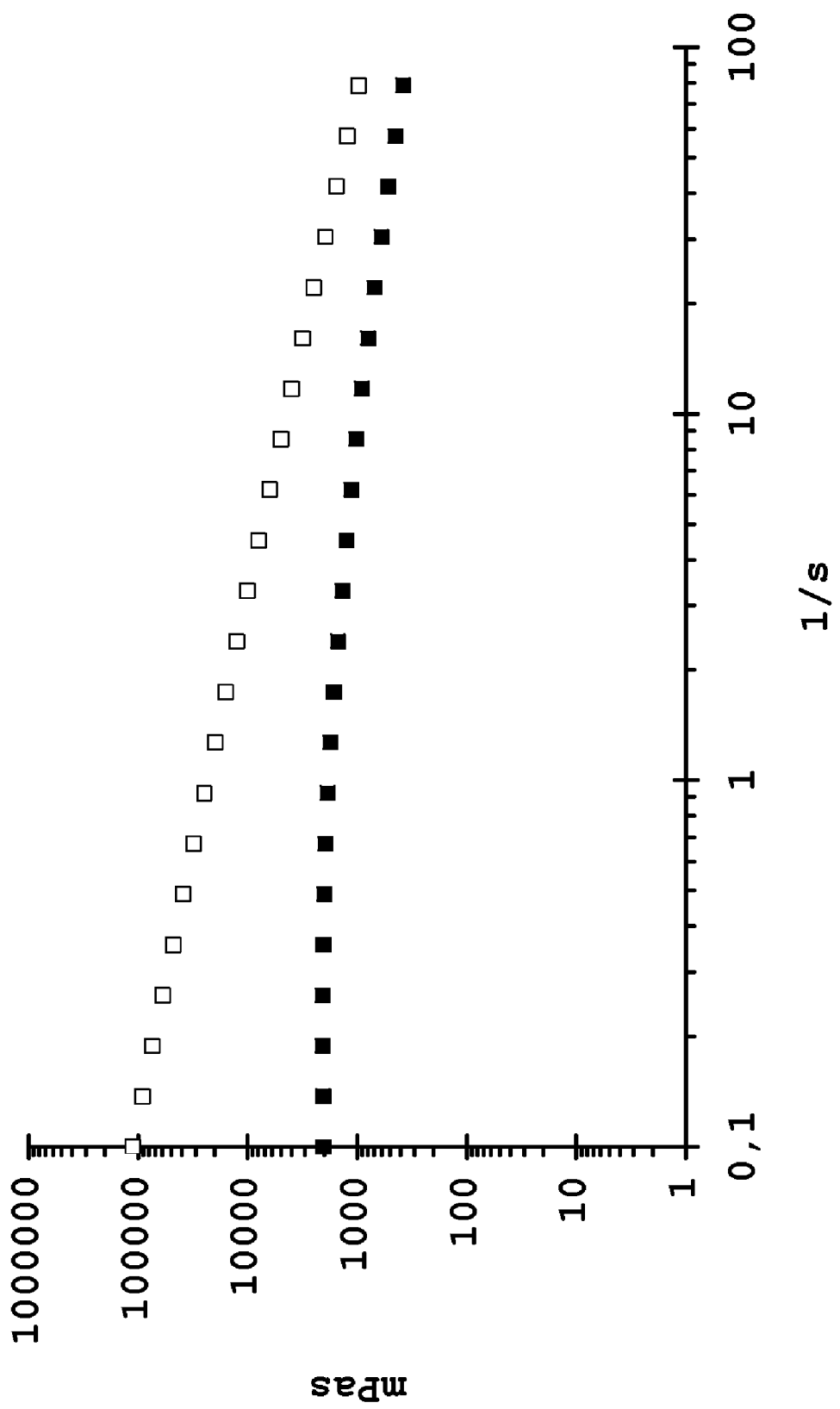
FIG. 2 shows the viscosity of the dispersions from Example D1 (characterized by ∥) and from Example D3 (characterized by □) in mPas as a function of the shear rate in $s^{-1}$. Clearly apparent is the lower viscosity over the entire shear range, and also the low structural viscosity of the inventive dispersion.
Figure 3:
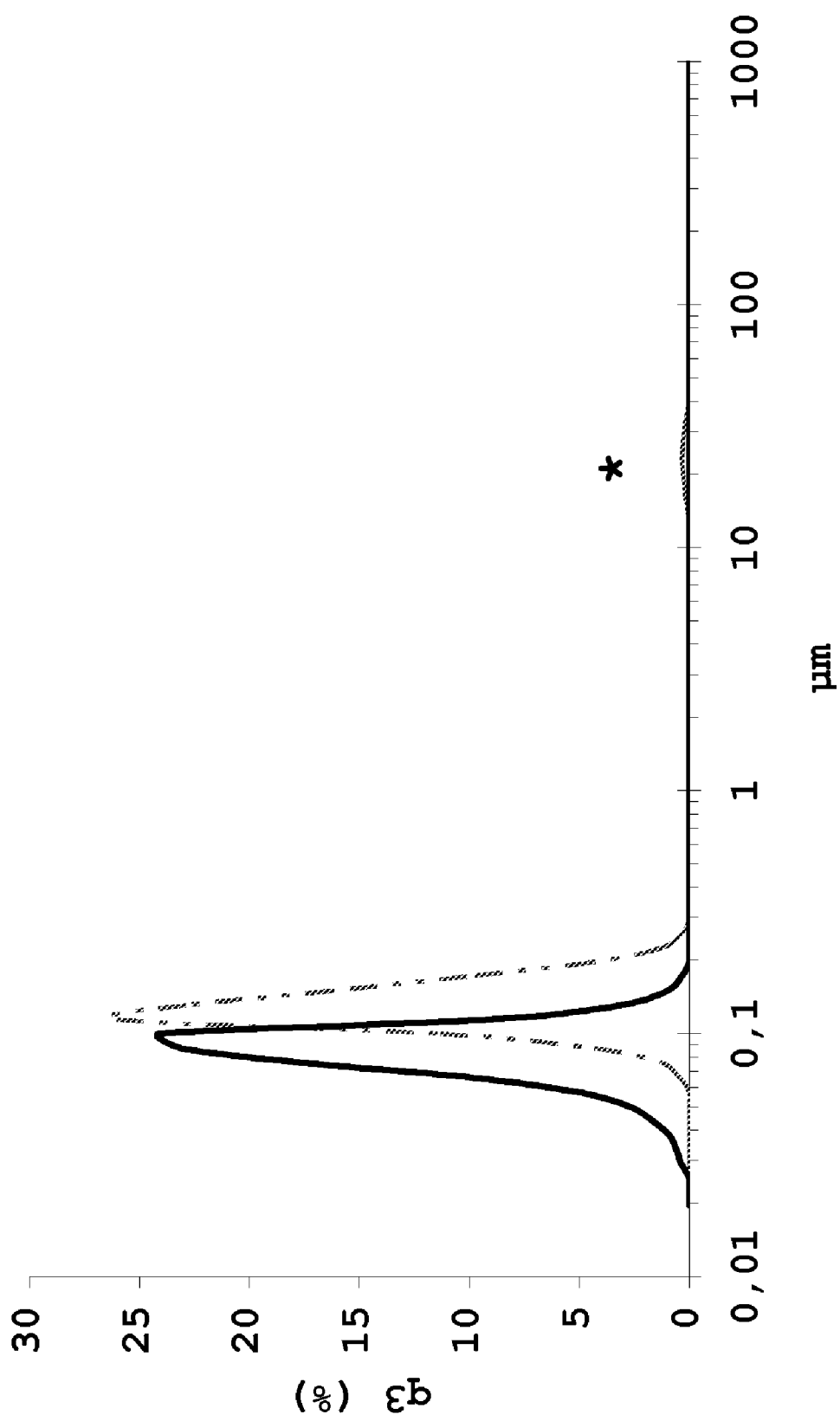
FIG. 3 shows the particle size, determined by means of laser diffraction, in the dispersions from Example 2 (continuous line) and from Example 3 (dashed line). The inventive dispersion is free from coarse fractions, whereas D3 exhibits such fractions (marked with *).

Owing to the low viscosity, high solids fraction and low air content, the inventive dispersion is ideally suitable for producing transparent sealants and filling compounds.

The invention claimed is:
1. A dispersion comprising water and mixed potassium silicon oxide powder, wherein
the mixed potassium silicon oxide powder
is in the form of aggregates of pore-free primary particles
contains 0.2% to 1.5% by weight of $K_2O$, distributed in the core and on the surface of the primary particles, and possesses a BET surface area of 100 to 350 $m^2/g$
and a specific DBP number, expressed as the DBP number per square meter of specific surface area, which is greater than or equal to that of a fumed silica powder of equal BET surface area that does not contain the potassium component and the dispersion
has a fraction of mixed oxide powder in the dispersion of 25% to 40% by weight,
the sum of water and mixed oxide powder is at least 98% by weight and
the pH is 9 to 11.5.

2. The dispersion according to claim 1, wherein the BET surface area of the mixed potassium silicon oxide powder is from 175 to 225 $m^2/g$.

3. The dispersion according, to claim 1, wherein the BET surface area of the mixed potassium silicon oxide powder is from 270 to 330 $m^2/g$.

4. A process for preparing the dispersion according to claim 1, comprising
circulating water from a reservoir via a rotor/stator machine and, via a feed means, continuously or discontinuously and with the rotor/stator machine running, introducing mixed oxide powder in an amount such as to result in a preliminary dispersion having a mixed oxide powder content of between 30% and 50% by weight, and, after all of the mixed oxide powder has been added,
closing the feed means and carrying out shearing under conditions of a pH of 2 to 4 and a temperature of 10 to 50° C. with a shear rate of 10,000 to 30,000 $s^{-1}$,
carrying out dilution with sufficient water that a final solids content is exceeded by 0.1% to 10%, based on the final solids content, and subsequently, under the said shearing conditions, adding an aqueous base, in an amount and concentration such that the amount needed to attain the final solids content is attained and a pH of 9 to 11.5 results.

5. The process according to claim 4, wherein the final solids content is exceeded by 0.4% to 2.5%, based on the final solids content.

6. A dispersion comprising water and mixed potassium silicon oxide powder, wherein
the mixed potassium silicon oxide powder
is in the form of aggregates of primary particles, has a BET surface area of 100 to 400 $m^2/g$, has an average aggregate diameter in the dispersion of less than 100 nm, and possesses a potassium fraction of 0.05% to 1.5% by weight, calculated as $K_2O$ and based on the mixed oxide powder and in which the potassium component is located exclusively on the surface of the primary particles and
the DBP number per square meter of specific surface area of the powder is more than 1.14 and the dispersion
has a fraction of mixed oxide powder in the dispersion of 25% to 40% by weight,
the sum of water and mixed oxide powder is at least 98% by weight and
the pH is 9 to 11.5.

7. The dispersion according to claim 6, wherein the BET surface area of the mixed potassium silicon oxide powder is from 175 to 225 $m^2/g$.

8. The dispersion according to claim 6, wherein the BET surface area of the mixed potassium silicon oxide powder is from 270 to 330 $m^2/g$.

9. The dispersion according to claim 6, wherein the potassium fraction is 0.1% to 0.4% by weight, calculated as $K_2O$ and based on the mixed oxide powder.

10. A process for preparing the dispersion according to claim 6, comprising
circulating water from a reservoir via a rotor/stator machine and, via a feed means, continuously or discontinuously and with the rotor/stator machine running, introducing mixed oxide powder in an amount such as to result in a preliminary dispersion having a mixed oxide powder content of between 30% and 50% by weight, and, after all of the mixed oxide powder has been added,
closing the feed means and carrying out shearing under conditions of a pH of 2 to 4 and a temperature of 10 to 50° C. with a shear rate of 10,000 to 30,000 $s^{-1}$,
carrying out dilution with sufficient water that a final solids content is exceeded by 0.1% to 10%, based on the final solids content, and subsequently, under the said shearing conditions, adding an aqueous base, in an amount and concentration such that the amount needed to attain the final solids content is attained and a pH of 9 to 11.5 results.

11. The process according to claim 10, wherein the final solids content is exceeded by 0.4% to 2.5%, based on the final solids content.

* * * * *